UNITED STATES PATENT OFFICE.

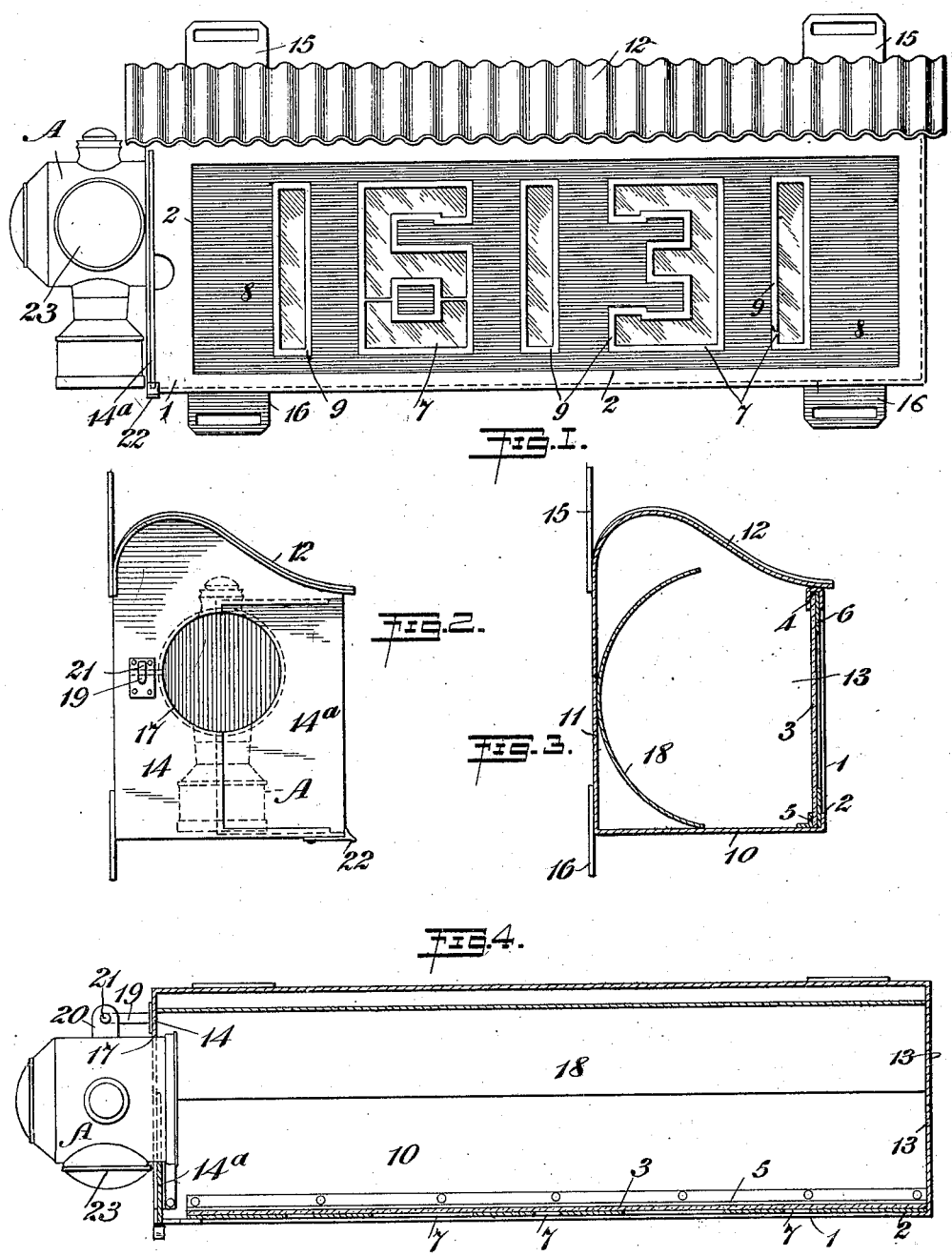

GEORGE BARTON MULLEN, OF NEW YORK, N. Y.

AUTOMOBILE NUMBER-DISPLAY DEVICE.

1,116,905.  Specification of Letters Patent.  Patented Nov. 10, 1914.

Application filed March 17, 1914. Serial No. 825,239.

*To all whom it may concern:*

Be it known that I, GEORGE B. MULLEN, a citizen of the United States, and a resident of the city of New York, Whitestone, borough of Queens, in the county of Queens and State of New York, have invented a new and Improved Automobile Number-Display Device, of which the following is a full, clear, and exact description.

This invention relates to license numbers for automobiles and other vehicles, and relates more particularly to an illuminated device of such design that it can be readily seen by day as well as by night.

The general objects of the present invention are to improve and simplify the construction of illuminated signs of the license type so as to be reliable and efficient in use and comparatively inexpensive to manufacture.

A further object of the invention is to provide a novel means for mounting the lamp at the end of a license box or case, whereby the lamp may be readily adjusted for lighting, cleaning or inspection, the end of the casing being provided with a slide or removable section which, when in position, locks the lamp in place, but which, when removed, permits the lamp to be swung outwardly where it is readily accessible. The removable section or slide at the end of the box serves also to hold the glass front of the box and the license plate in place and prevents these parts from working out laterally from the grooves arranged in the case to receive them. The lamp is of that type commonly used on vehicles and the colorless lens is disposed within the box so as to illuminate the same, while the usual red lens faces to the rear so as to serve as a tail light.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention, and wherein similar characters of reference indicate corresponding parts in all the views, Figure 1 is a front elevation of the illuminated license box; Fig. 2 is an end view thereof with the lamp shown in dotted lines; Fig. 3 is a vertical transverse section of the box; and Fig. 4 is a horizontal section of the box with the lamp in position.

Referring to the drawing, 1 designates the front of the license box, which front is provided with a rectangular opening 2 closed by a pane of glass 3 which is held in place by the upper and lower edges entering grooves 4 and 5 extending longitudinally of the front of the casing. In front of this glass is a metal or other plate 6 which also fits in the said grooves, and this plate has suitable license characters 7 cut out therein like a stencil, so that rays of light from within the box can pass out through the characters 7. The surface 8 of the plate 6 is painted or otherwise suitably colored, and immediately around the characters 7 are character outlines 9 which contrast in color from the ground 8, so that the license characters can be readily seen by day.

The body of the box or casing includes a bottom 10, a back 11, a sloping corrugated top 12, a right end wall 13 and left end wall made in two parts 14 and 14ª. This body may be fastened in any suitable manner to the vehicle, as, for instance, by upper or lower lugs 15 and 16. The left wall of the box has an opening 17 formed half in the section 14 and half in the section 14ª of the said wall, so as to receive the lamp A which is mounted exterior to the body in such a manner that the rays of light passing through the front lens of the lamp will enter the box and shine through the characters of the license. The interior of the box is preferably bright so as to better reflect the light, and, if desired, a reflector 18 may be mounted in the box to reflect the rearwardly directed rays from the lamp forwardly through the license characters. On the end of the casing is a bracket or other suitable support 19 with which a lug 20 on the lamp A engages, and this lamp swings on the end 21 of the bracket (Fig. 4). The section 14ª is slidably mounted in the case and is normally held in place by a suitable catch 22, Fig. 2, which, when released, enables the section 14ª to be removed forwardly from the case, and when so removed the lamp can be swung outwardly from the box on the pivot 21 as a center, and when in this position the lamp can be readily lighted, cleaned or inspected. When the slide 14ª is removed, the license plate 6 and the glass 3 can be taken out through a left end, Fig. 4, of the case, for enabling the said parts to be readily cleaned. It will thus be seen that the part 14ª serves to retain the lamp in operative position and holds the license plate and glass front in place.

It will be noted that the side lens 23 of the lamp serves as a tail signal, as this side lens is red and is disposed so as to direct the rays of light rearwardly from the vehicle, and consequently the invention constitutes a combined illuminated license and tail signal.

From the foregoing description taken in connection with the accompanying drawing, the advantages of the construction and method of operation will be readily understood by those skilled in the art to which the invention appertains, and while I have described the device which I now consider to be the best embodiment thereof, I desire to have it understood that the device shown is merely illustrative, and that such changes may be made when desired as are within the scope of the appended claims.

Having thus described my invention, I claim as new and desire to secure by Letters Patent:

1. A license number display device comprising a box having an opening at its front and an opening in one end, guides in the case adjacent the first-mentioned opening, a pane of glass covering the first-mentioned opening and inserted in the guides, a character-bearing element disposed in the guides and overlying the pane of glass, a removable slide at the open end of the box which serves to retain the pane and element in place, and a lamp movably mounted on the open end of the box and engaged by the said slide to hold the lamp in such position that its ray-directing part directs rays of light into the box through the end opening, whereby the characters of the said element are rendered visible, said lamp having a red lens for providing a tail signal.

2. A license box having an opening at one end, license characters at the front of the box and adapted to be rendered visible by interior illumination of the latter, a slide movably mounted on the open end of the box, a lamp mounted outside the box and having a light-directing portion arranged to extend into the open end of the box, and means for holding the slide in contact with the said light-directing portion to retain the lamp in coöperative relation with the box to illuminate the interior thereof.

3. A license box having an opening at one end, license characters at the front of the box and adapted to be rendered visible by interior illumination of the latter, a slide movably mounted on the open end of the box, a lamp mounted outside the box and having a light-directing portion arranged to extend into the open end of the box, means for holding the slide in contact with the said light-directing portion to retain the lamp in coöperative relation with the box to illuminate the interior thereof, a bracket on the open end of the box, and a pivotal connection between the lamp and bracket, said lamp having a red lens located exteriorly of the box to serve as a tail light.

In testimony whereof I have signed my name to this specification in the presence of two subscribing witnesses.

GEORGE BARTON MULLEN.

Witnesses:
  JOSEPH BERNHARDT,
  GEORGE JENE.

---

Copies of this patent may be obtained for five cents each, by addressing the "Commissioner of Patents, Washington, D. C."